United States Patent [19]
Tischner et al.

[11] 3,710,332
[45] Jan. 9, 1973

[54] METHOD AND APPARATUS FOR FINDING THE DIRECTION OF SIGNALS

[75] Inventors: Horst Tischner, Hannover; Alfred Schief, Eningen; Hugo Baur, Schwabstr., all of Germany

[73] Assignee: Federal Republic of Germany as represented by the Federal Defense Minister, Bonn, Germany

[22] Filed: April 21, 1966

[21] Appl. No.: 545,801

[52] U.S. Cl............343/113 R, 343/100 CL, 343/119
[51] Int. Cl................................................G01s 3/46
[58] Field of Search....................343/100.7, 113, 119

[56] References Cited

UNITED STATES PATENTS

| | | | |
|---|---|---|---|
| 3,028,600 | 4/1962 | Bailey | 343/113 |
| 3,290,684 | 12/1966 | Renn et al. | 343/100.7 |

*Primary Examiner*—Benjamin A. Borchelt
*Assistant Examiner*—Richard E. Berger
*Attorney*—Michael S. Striker

[57] ABSTRACT

Two directional receivers and a non-directional receiver produce voltages when receiving a main signal and interfering signal. The voltages are cross-correlated so that the resultant voltages are functions of the angle between the direction of the main signal and a reference line, and can be evaluated to determine the direction of the main signal.

22 Claims, 2 Drawing Figures

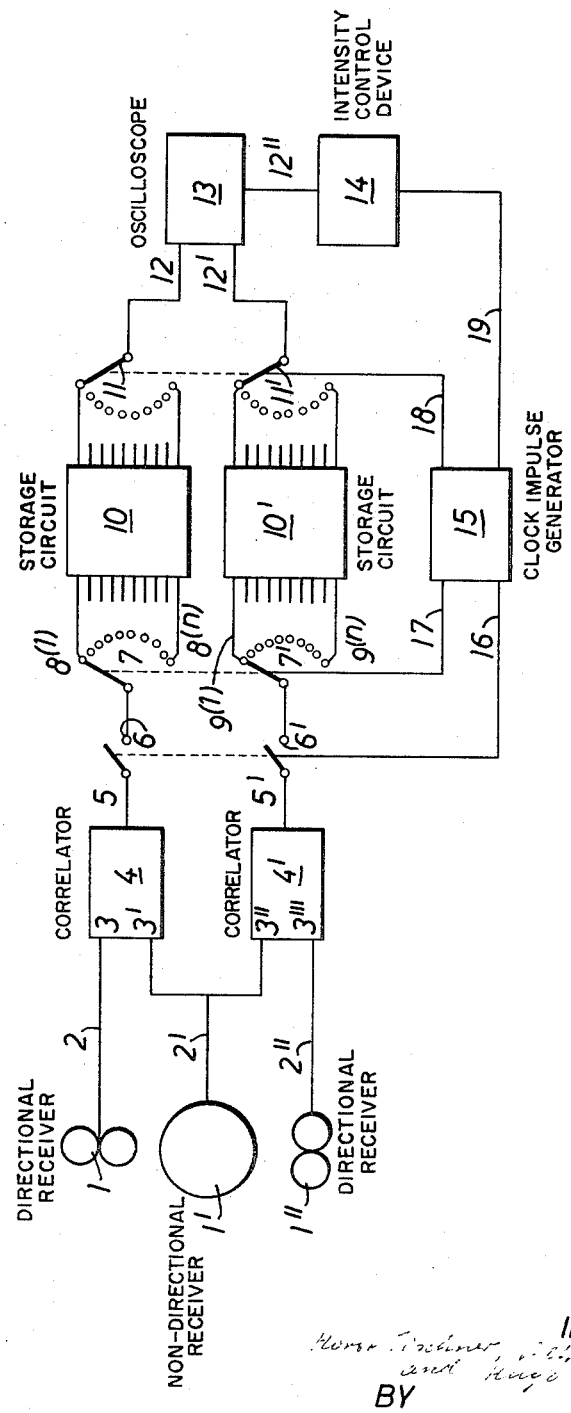

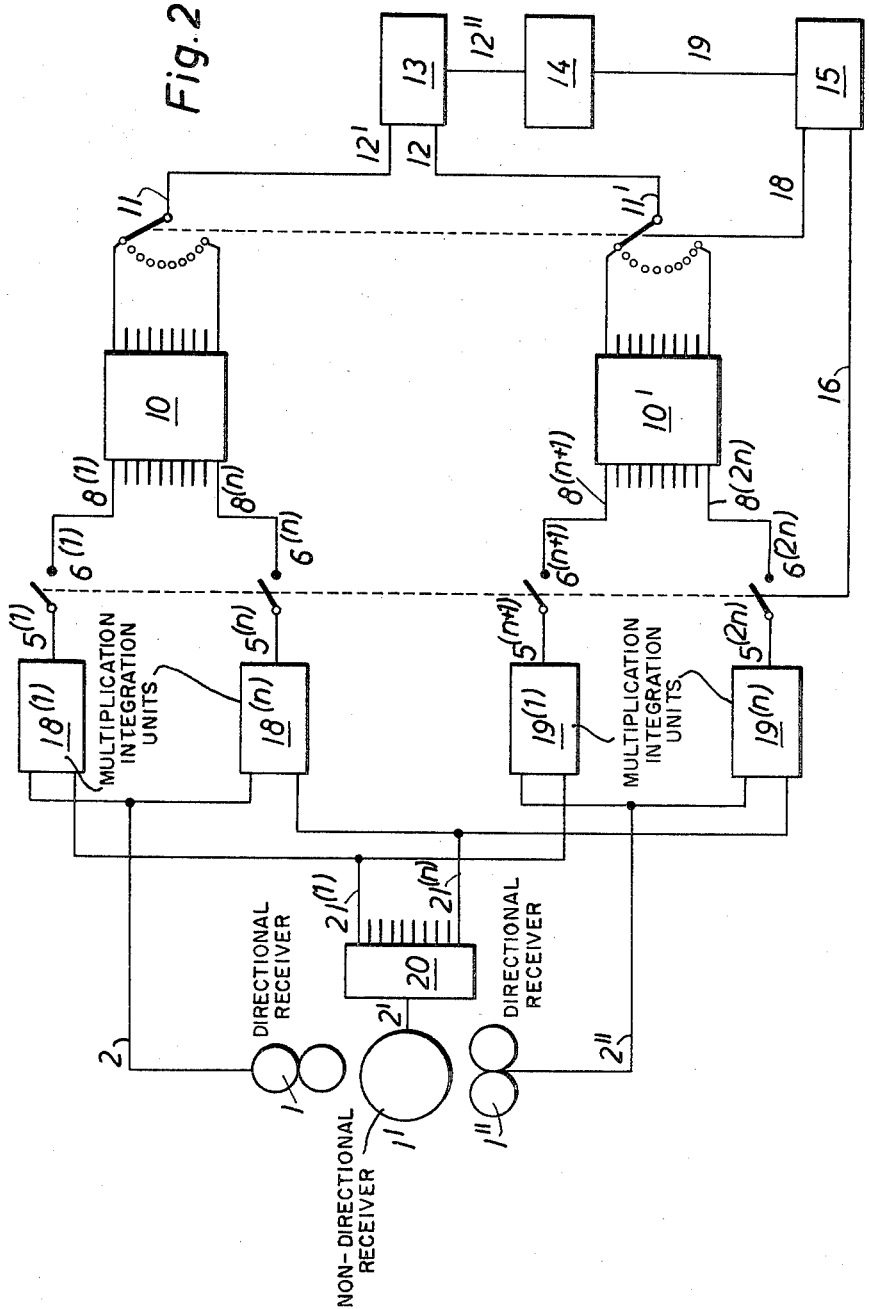

METHOD AND APPARATUS FOR FINDING THE DIRECTION OF SIGNALS

The present invention relates to a method and apparatus for finding the direction of signals, and more particularly for finding the direction of signals in the presence of interference signals.

Electroaccoustic, radar, and radio-astronomy direction finders establish direction depending measured values which are evaluated in a suitable manner, and then indicated. The reception and manner of evaluation depends on the properties of the expected signals and of the simultaneously received interference signals. In addition to methods which depend on frequency selection, methods are known which apply a correlation analysis for suppressing the interference signals in the indication. The known methods for correlating the results of direction finders, make use of the principle of time selection, and may be classified with phase direction finding methods. It is a common feature of all these methods that pulse time differences are determined at a receiver base.

It is one object of the invention to provide a direction finding method and apparatus which operates independently of the transmission time or pulse timing of the signals.

It is another object of the invention to provide a direction finding method and apparatus for finding the direction of signals by cross correlating the voltages produced by receivers receiving the signals.

It is another object of the invention to permit the finding of periodical or quasi-periodical signals in the presence of stochastic interference signals.

It is another object of the invention to find the direction of signals by receiving apparatus whose dimensions are small in relation to the wave length of the evaluated signals or of the interference signals.

It is, however, required that the coherence length of the signal wave trains is greater than the coherence length of the wave trains of the interference signals.

In accordance with the invention, the signals are received by a plurality of receivers having different directional characteristics and the voltages produced by different receivers are mixed in accordance with the correlation function. The correlation function is computed from the output voltages of a plurality of receivers for different time lags or delay times. In case of periodic signals, different time lags may be successively computed. In the case of quasi-periodic signals, simultaneous computation of several values of time lags is necessary. The composite voltages representing the correlation function of the voltages produced by different receivers, are stored and either directly indicated, or evaluated in any other manner.

As compared with the prior art it is an advantage of the invention that a receiver base of the type required for the known direction finding methods is eliminated. Furthermore, the time required for the determination of the signal direction, can be shortened by simultaneous computations. If this method of the invention is applied, the signals need not be periodic.

In accordance with the method of the invention, a plurality of directional receivers is provided whose output voltages are mixed in accordance with a cross correlation analysis for suppression of interference signals. If desired, the cross correlation analysis is carried out simultaneously for the required number of time lag values.

One method of the invention comprises the steps of receiving signals by directional receivers, and preferably also by a non-directional receiver; mixing and cross-correlating the voltages produced by the receivers so as to produce a plurality of composite voltages which are different functions of the angle between the direction of signals and a reference line defined by the directional receivers; and evaluating the functions to find the angle and directions of the signals.

In a preferred embodiment of the invention, the signals are received by two directional receivers at an angle of 90°, and by a non-directional receiver. The composite voltages produced of the output voltages of each directional receiver, and of the non-directional receiver, are stored in storing devices sequentially or simultaneously, and correlated voltages are picked up from the storage devices and evaluated in a suitable manner, for example by supplying a pair of composite voltages to the plates of an oscillograph. It is advantageous to use an intensity control device for suppressing the indications produced in the oscillograph by an interfering signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic diagram illustrating a first embodiment of the invention; and FIG. 2 is a schematic diagram illustrating a second embodiment of the invention including simultaneously operating correlating mixers with a common delay device, and suited for finding the direction of periodic, as well as of quasi-periodic signals.

Referring now to the drawings and more particularly to FIG. 1, two directional receivers 1 and 1'', and a non-directional receiver 1' are provided. Receivers 1 and 1'' have 8-shaped characteristics and are arranged at an angle of 90° to each other. Receiver 1' has a circular characteristic. If air oscillations emanating from a signal source are to be evaluated, pressure gradient microphones are used in the directional receivers. For water oscillations, corresponding directional hydrophones, and for electromagnetic oscillations, linear directional antennas, or direction finder loops are used.

A pair of correlating mixers or correlators 4 and 4' are provided which have inputs 3,3', 3'', 3''', respectively, and outputs 5, 5' respectively connected to switches 6 and 6'. Input 3 is connected by a line 2 with directional receiver 1, input 3''' is connected by a line 2'' to directional receiver 1'', and inputs 3' and 3'' are connected by a common line 2' with the non-directional receiver 1'. Receiver 1,1',1'' are arranged in such a manner that there are no differences of the transition times of the receivers, in other word, the signals are received without relative differences in the time of travel.

Switches 6, 6' are operated in synchronism by a synchronizing clock impulse generator 15 connected to switches 6, 6' by a line 16. Stepping switches 7,7', connect switches 6, 6', respectively, with the inputs $8^{(1)}$ to $8^{(n)}$ of storage device 10 and with the inputs $9^{(1)}$ to $9^{(n)}$ of storage device 10'. Switches 7, 7' are connected by a line 17 to impulse generator 15 and controlled by the same. It will be understood that these sequentially operating switches 7,7' may be electronic switches although schematically illustrated as a switcharm passing over contacts.

Storage devices 10 and 10' have corresponding numbers of outputs which are connected to sequentially operating switches 11,11' respectively, which are controlled by a line 18 from impulse generator 15 to operate in synchronism. Each storage device 10, 10' has n storage elements, and each storage element has an input and an output.

Switches 11, 11' are operated in synchronism to successively connect pairs of outputs of storage devices 10, 10' to lines 12, 12' which are connected to the y-deflector and the x-deflector of an oscillograph 13 connected by line 12'' with an intensity control device 14 operating in synchronism with the switches and also controlled by impulse generator 15 over line 19.

When directional receivers 1, 1'' receive signals, voltages are produced which are respectively proportional to the cosine and sine of the azimuth of the signal, or to the angle between the direction of the signal and the reference line defined by directional receivers 1, 1''. The output voltage of receiver 1' is proportional to the sum of the received signals.

Assuming that the azimuth of the signal source is $\phi_1$ and the azimuth of the source of interference signals is $\phi_2$ the output voltage of receiver 1' is $$x(t) = s(t) + n(t), \qquad 1$$

wherein $s(t)$ is the component of the output voltage proportional to the signal, and $n(t)$ is the component of the output voltage proportional to the interference signal.

Assuming that maximum sensitivity and yield of directional receivers 1 and 1'' are identical with the sensitivity and yield of non-directional receiver 1', the output voltage of directional receiver 1 can be expressed by the following equation $$y_1(t) = s(t)\cos\phi_1 + n(t)\cos\phi B2 \qquad 2$$

while the output voltage of directional receiver 1'' can be expressed by the equation $$y_2(t) = s(t)\sin\phi_1 + n(t)\sin\phi B2 \qquad 3$$

It is known to those skilled in the art that a cross correlation function can be defined by the following equation $$K_{xy}(\tau) = \lim_{T \to \infty} \frac{1}{2T}\int_{-T}^{+T} x(t)y(t+\tau)\,dt \qquad (4)$$

wherein $\tau$ represents the time lag, and T represents the time. For the time range between $O$ and $T$, the correlation function can be defined by the following equation $$K_{xy}(\tau, T) = \frac{1}{T}\int_0^T x(t)y(t+\tau)\,dt \qquad (5)$$

Since infinitely great integration times are neither practical nor necessary, the range of integration is adapted to the prevailing situation. As is shown by the equations, the correlation function is a function of the time lag or delay time. In accordance with the invention, the correlation function is computed for different values of the time lag. The intervals between the time lags are selected in accordance with the particular situation. If the different time lags or delay times are selected to be at close time intervals, the correlation function can be very well evaluated.

If the expression $x(t)$ referring to the nondirectional receiver 1' and the expression $y_1(t)$ referring to the directional receiver 1 are used in the correlation function, the following equation results:

$$K_{xy1}(\tau,T) = K_{ss}(\tau,T)\cos\phi_1 + K_{sn}(\tau,T)\cos\phi_1$$

$$+ K_{ns}(\tau,T)\cos\phi_2 + K_{nn}(\tau,T)\cos\phi_2$$

Correspondingly, the expressions $x(t)$ referring to the non-directional receiver 1' and the expression $y_1(t)$ referring to the directional receiver 1'' result in a cross correlation function which is expressed by the following equation:

$$K_{xy2}(\tau,T) = K_{ss}(\tau,T)\sin\phi_1 + K_{sn}(\tau,T)\sin\phi_1$$

$$+ K_{ns}(\tau,T)\sin\phi_2 + K_{nn}(\tau,T)\sin\phi_2$$

It is assumed that the main signal and the interference signal are not coherent, so that $K_{sn}(\tau,T)$ and $K_{ns}(\tau,T)$ are zero.

Under this assumption, the correlation function relating to receivers 1 and 1' is expressed by the following equation:

$$K_{xy1}(\tau,T) = K_{ss}(\tau,T)\cos\phi_1 + K_{nn}(\tau,T)\cos\phi_2$$

and the correlation function relating to receivers 1' and 1'' can be expressed by the following equation:

$$K_{xy2}(\tau,t) = K_{ss}(\tau,T)\sin\phi_1 + K(\tau,T)\sin\phi_2 \qquad 9$$

If the time lag or delay time is great as compared with the half width $\Delta\tau$ of the autocorrelation function $K_{nn}(\tau, T)$ of the interference signal, $K_{nn}(\tau,T)$ is negligible, and the following correlation functions are obtained for the pair of receivers 1, 1' and the pair of receivers 1', 1'':

$$K_{xy1}(\tau,T) \approx K_{ss}(\tau,T)\cos\phi_1, \qquad 10$$

and $$K_{xy2}(\tau,T) \approx K_{ss}(\tau, T)\sin\phi_1 \qquad 11$$

When voltages analog to correlation functions as expressed by above are applied to the x-plate and to the y-plate of an xy-oscillograph, a straight line is produced on the screen which has a gradient of tang $\phi_1$. The angle between the x-axis and the line is the wanted azimuth $\phi_1$ of the signal source. The correlator devices 4 and 4' simultaneously compute $K_{xy1}(\tau, T)$ and $K_{xy2}(\tau, T)$ for successive delay times $\tau_k(K = 1 \ldots n)$ starting with $\tau_1 = 0$. After completion of each calculation for the respective delay time $\tau_k$, switches 6 and 6' are closed, and the results of successive calculations with increasing values of the delay time, are sequentially introduced into the storage elements of storage devices 10 and 10'. Multiplication and integration units, and delay lines forming parts of correlating mixers 4, 4' are not illustrated in FIG. 1 for the sake of simplicity.

When all the calculations have been completed and corresponding values entered into the storage elements of storage devices 10, 10', the synchronized switches 11 and 11" sequentially sense the storage elements of storage devices 10, 10' and supply the values to the x-deflector and y-deflector of the oscillograph 13.

The intensity control device 14 brightens or darkens the indication of oscillograph 13, and is controlled by the synchronizing pulse generator 15 to suppress measured values within the half width $\Delta\tau$ of the correlation function $K_{nn}(\tau,T)$ of the interference signal, while the oscillograph is controlled to produce bright indications for the remaining values so that on the screen a series of dots located on a straight line appear. The angle between this straight line and the axis of the oscillograph is the azimuth $\phi_1$ of the main signal source. In order to find the direction of a signal in the manner described with reference to FIG. 1, it is necessary that signals are transmitted by the main signal source as well as by the interference signal source in a stationary manner at least for the time required for n calculating cycles.

A second embodiment of the invention is illustrated in FIG. 2 in which parts used in the embodiment of FIG. 1 are indicated by like reference numerals. However, the electric connections between the parts are different, and the functions of the parts maybe adapted to the different method carried out by the embodiment of FIG. 2.

The delay lines, not shown, of the correlating mixers 4 and 4' of the first embodiment, are replaced in the embodiment of FIG. 2 by a common delay device 20 connected by a line 2' to the non-directional receiver 1'. Delay device 20 may include a sequential register and has n outputs $21^{(1)}$ to $21^{(n)}$, at which n different time lags or delay times $\tau_k(K = 1 \ldots n)$ can be simultaneously evaluated.

While in the embodiment of FIG. 1 each of the correlated mixers 4 and 4' includes multiplication and integration units, the embodiment of FIG. 2 provides n multiplication- integration units $18^{(1)}$ to $18^{(n)}$ and $19^{(1)}$ to $19^{(n)}$ which are connected to the outputs of delay device 20, and by lines 2 and 2' to the directional receivers 1 and 1", respectively.

The sequentially operating switches 7 and 7' are not necessary in the embodiment of FIG. 2 in which switches $6^{(1)}$ to $6^{(n)}$ connect the outputs $5^{(1)}$ to $5^{(n)}$ of the units $18^{(1)}$ to $18^{(n)}$ with the inputs $8^{(1)}$ to $8^{(n)}$ of the storage device 10, and switches $6^{(n+1)}$ to $6^{(2n)}$ connect the outputs $5^{(n+1)}$ to $5^{(2n)}$ of the units $19^{(1)}$ to $19^{(n)}$ with the inputs $18^{n+1}$ to $18^{(2n)}$ of the second storage device 10'. As explained with reference to FIG. 1, each storage device comprises n units having outputs connected to sequential switches 11 and 11' by which the storage devices 10, 10' are respectively connected to the x-and y-plates 12 and 12' of the oscillator 13. A synchronizing impulse generator 15 controls switches 6 over line 16, switches 11, 11' over line 8, and the intensity control device 14 over line 19 so that the operation is synchronized.

The output voltages of the directional receivers 1 and 1" are supplied by lines 2 and 2" to one input of each of the multiplication-integration units $18^{(1)}$ to $18^{(n)}$, and $19^{(1)}$ to $19^{(n)}$. The output voltage of non-directional receiver 1' is supplied by line 2' to a delay device 20 whose n outputs $21^{(1)}$ to $21^{(n)}$ correspond to n delay times $\tau_k(k = 1$ to $n)$. For example, for a delay time $\tau$ equal to $\tau_1$, the delay device 20 is connected by the line $21^{(1)}$ with the multiplication-integration units $18^{(1)}$ and $19^{(1)}$. Corresponding connections are provided for the n outputs associated with n delay times $\tau$. After a calculating cycle T, the values of the cross correlation function $K_{xy1}(\tau,T)$ are simultaneously obtained at the outputs of the multiplication-integration units $18^{(1)}$ to $18^{(n)}$, and the values of the cross correlation function $K_{xy1}(\tau,T)$ are simultaneously obtained at the outputs of the multiplication-integration units $18^{(1)}$ to $18^{(n)}$, and the values of the cross correlation function $K_{xy2}(\tau,T)$ are obtained simultaneously at the outputs of the multiplication-integration units $19^{(1)}$ to $19^{(n)}$. By simultaneous operation of the switches $6^{(1)}$ to $6^{(2n)}$, the respective n values of $K_{xy1}(\tau, T)$ and $K_{xy2}(\tau,T)$ are stored in the corresponding units of storage devices 10 and 10'. After each calculating cycle T of the correlating multiplication and integration units, the stored values are sequentially sensed by switches 11, 11' and successively supplied to the oscillograph 13 which indicates a straight line whose angle with the horizontal x-axis represents the azimuth of the main signal source. But in contrast to the method and apparatus described with reference to FIG. 1, the arrangement of FIG. 2 requires a stationary main signal source and interference source only for a computing cycle T.

In the absence of interference signals, it is sufficient to compute the correlation function only for $\tau = 0$. In this event, the oscillograph indicates only a bright point which, together with the origin of the x-and y-coordinates of the screen, determines the direction of the straight line representing the azimuth of the signal.

It will be understood that each of the elements described above, or two or more together, may also find a useful application in other types of methods and apparatus for finding the direction of signals differing from the type described above.

While the invention has been illustrated and described as embodied in a method and apparatus for finding the direction of signals in the presence of interference signals, it is not intended to be limited to the details shown, since various modifications and structural changes may be made without departing in anyway from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

We claim;

1. A method for determining the direction of the signals of a signal source in the presence of interfering signals, comprising the steps of receiving the signals of the signal source and the interference signals by receivers having different directional characteristics and producing voltages; cross-correlating the voltages produced by said receivers to produce voltages which are functions of the angle between said direction and a reference line defined by said directional receivers; and evaluating said functions to find said angle and said direction of the signals of said signal source.

2. The method according to claim 1 including receiving said signals by directional and non-directional receivers; and cross-correlating the voltage produced by a directional receiver with the voltage produced by a nondirectional receiver to produce said composite voltages.

3. The method according to claim 2 including receiving the signals by two directional receivers set at an angle of 90° and by one non-directional receiver.

4. The method according to claim 2 including sequentially storing each of said composite voltages at time intervals; and sequentially picking up the stored composite voltages at time intervals.

5. The method according to claim 3 and including suppressing components of said composite voltages produced by said interfering signals; and wherein said evaluating includes supplying the two resultant composite voltages to the plates of an oscillograph so that said oscillograph indicates said angle between said direction and said reference line.

6. The method according to claim 3 including the steps of storing each of said composite voltages; picking up said stored voltages; and wherein said evaluating includes supplying said composite voltages to the plates of an oscillograph so that the same indicates said angle between said direction and said reference line.

7. An apparatus for determining the direction of signals of a signal source in the presence of interfering signals, comprising, in combination, a plurality of receivers including two directional receivers set at an angle to each other; correlator means connected with at least one pair of said receivers for correlating voltages received from the same so as to produce composite voltages which are different functions of the angle between said direction and a reference line defined by said directional receivers; and evaluating means connected with said correlator means for receiving said composite voltages and controlled by the same to indicate said last-mentioned angle and said direction.

8. The apparatus according to claim 7, wherein said plurality of receivers also includes a non-directional receiver; and wherein said correlator means include a pair of correlators respectively connected with one and the other of said directional receivers, and with said non-directional receiver.

9. The apparatus according to claim 7, wherein said evaluating means include storage means connected with said correlator means for receiving said correlated voltages, and indicator means controlled by said composite voltages to indicate said last-mentioned angle and said direction.

10. The apparatus according to claim 7, wherein said plurality of receivers also includes a non-directional receiver; wherein said correlator means include a pair of correlators respectively connected with one and the other of said directional receivers, and with said non-directional receiver; wherein said directional receivers are set at an angle of 90° to each other; and wherein said evaluating means include storage means for said composite voltages, and an oscillograph controlled by said composite voltages to indicate said last-mentioned angle and said direction.

11. The apparatus according to claim 10 and including means for suppressing in said oscillograph components of said composite voltages produced by said interfering signals.

12. The apparatus according to claim 7, wherein said plurality of receivers includes also a non-directional receiver; wherein said correlator means are also connected with said non-directional receiver and include multiplication and integration devices, and delay means; and including storage means for storing said composite voltages; and wherein said evaluating means are connected with said correlator means and controlled by the stored composite voltages.

13. The apparatus according to claim 12, wherein said delay means are connected with said directional and non-directional receivers.

14. The apparatus according to claim 12, wherein said delay means include a sequential register.

15. The method according to claim 1 including receiving said signals by directional and non-directional receivers; cross-correlating the voltage produced by a directional receiver with the voltage produced by a non-directional receiver to produce said composite voltages; and computing, simultaneously with cross-correlating said voltages, the cross-correlation functions for different delay times.

16. The method according to claim 1 including receiving said signals by directional and non-directional receivers; cross-correlating the voltage produced by a directional receiver with the voltage produced by a non-directional receiver to produce said composite voltages; and computing, simultaneously with cross-correlating said voltages, the cross-correlation functions for a delay time of zero.

17. The method according to claim 1 including interpolating periodical components of said voltages.

18. The method according to claim 1 including coding of the voltage values before and after correlating said voltages.

19. The method according to claim 1 including expressing voltage values as digits for the purpose of calculations.

20. The method according to claim 1 including storing said composite voltages and evaluating the stored voltages.

21. The method according to claim 1, including the step of positioning said receivers for receiving said signals without differences in the time of travel of the same.

22. An apparatus according to claim 7, wherein said receivers of said plurality of receivers are located adjacent each other for receiving said signals without differences in the time of travel.

* * * * *